United States Patent [19]

Stefik et al.

[11] Patent Number: 4,974,173
[45] Date of Patent: Nov. 27, 1990

[54] SMALL-SCALE WORKSPACE REPRESENTATIONS INDICATING ACTIVITIES BY OTHER USERS

[75] Inventors: Mark J. Stefik, Portola Valley; Daniel G. Bobrow, Palo Alto; Stanley M. Lanning, La Honda; Deborah G. Tatar, Palo Alto; Gregg S. Foster, Half Moon Bay, all of Calif.

[73] Assignee: Xerox Corporation, Stamford, Conn.

[21] Appl. No.: 485,793

[22] Filed: Feb. 22, 1990

Related U.S. Application Data

[63] Continuation of Ser. No. 127,814, Dec. 2, 1987, abandoned.

[51] Int. Cl.$^5$ .............................................. G06F 3/14
[52] U.S. Cl. .................................... 364/521; 340/717; 340/721
[58] Field of Search ............... 364/518, 521, 200, 900; 379/53, 54, 96, 100; 358/85, 86; 340/716-718, 721

[56] References Cited

U.S. PATENT DOCUMENTS

| | | | |
|---|---|---|---|
| 4,414,621 | 11/1983 | Bown et al. | 360/200 |
| 4,516,156 | 5/1985 | Fabris et al. | 358/85 |
| 4,525,779 | 6/1985 | Davids et al. | 364/200 |
| 4,560,833 | 12/1985 | Weber et al. | 179/2 TV |
| 4,650,929 | 3/1987 | Boerger et al. | 358/86 |
| 4,654,483 | 3/1987 | Imai et al. | 379/54 |
| 4,686,698 | 8/1987 | Tompkins et al. | 379/53 |

OTHER PUBLICATIONS

Stefik, M., Foster, G., Bobrow, D. G., Kahn, K., Lanning, S., and Suchman, L., "Beyond the Chalkboard: Computer Support for Collaboration and Problem Solving in Meetings," Communications of the ACM, Jan. 1987, vol. 30, No. 1, pp. 32-47.

Halasz, F. G., "Reflections on NoteCards: Seven Issues for the Next Generation of Hypermedia Systems" Hypertext '87 Papers, Nov. 13-15, 1987, Chapel Hill, N.C., pp. 345-365.

Bobrow, D. G. and Stefik, M., The LOOPS Manual, Xerox Corporation, Dec. 1983.

Stefik, M., Bobrow, D. G., Foster, G., Lanning, S. and Tatar, D., "WYSIWIS Revised: Early Experiences with Multiuser Interfaces," ACM Transactions on Office Information Systems, vol. 5, No. 2, Apr. 1987, pp. 147-167.

Kasperski, R., Chang, E., Mellon, L., "Cantata: Group Protocols in a Conferencing Environment," IEEE International Conference on Systems, Man, and Cybernetics, vol. 2, 1986, pp. 1343-1346.

Meyrowtiz, N., "Intermedia: The Architecture and Construction of an Object-Oriented Hypermedia System and Applications Framework," OOPSLA Proceedings, Sep. 1986, pp. 186-201.

Garrett, L. N., Smith, K. E., and Meyrowitz, N., "Intermedia: Issues, Strategies, and Tactics in the Design of a Hypermedia Document System," Proceedings of the Conference on Computer-Supported Collaborative Work, Austin, Tex., Dec. 3-5, 1986, pp. 163-174.

Foster, G., "Collaborative Systems and Multi-User Interfaces," Ph.D. Thesis, University of California, Com- (List continued on next page.)

Primary Examiner—David L. Clark
Attorney, Agent, or Firm—James T. Beran

[57] ABSTRACT

In a collaborative system in which a body of shared data may be accessed by more than one user, a small-scale representation of the body of shared data displayed to one user includes an indication of the activities of other users. A user that is not viewing the shared data at full scale can thus obtain information about the activities of other users from a small-scale representation. The small-scale representation can indicate the type of activity, the extent or rate of changes in the shared data, the other users viewing the full-scale representation, or can show the shared data in shrunken form, indicating the parts that have been changed. The extent or rate of changes can be indicated with a quantitative indicator such as a gauge.

28 Claims, 3 Drawing Sheets

OTHER PUBLICATIONS

*puter Science Division*, Report No. CSD/UCB 1986, 86/326.

"Filing," *VP Series Reference Library*, Version 1.0, Xerox Corporation, 1985, pp. 1-60.

*Interleaf Technical Publishing Software Reference Manual*, Release 3.0, vol. 1, 1986, pp. 15-1-15-18, 16-1-1-6-19.

Sarin, S.K., and Greif, I., "Software for Interactive On-Line Conference", *Proceedings ACM-SIGOA Conference on Office Information Systems*, Toronto, Canada, Jun. 25-27, 1984, pp. 1-29.

Sarin, S. K., *Interactive On-Line Conferences*, Ph.D. Thesis, M.I.T. Department of Electrical Engineering and Computer Science, May 1984, pp. 1-227.

Sarin, S. K., and Greif, I., "Computer-Based Real-Time Conferencing Systems," Computer, Oct. 1985, pp. 33-45.

Greif, I., Seliger, R. and Weihl, W., "Atomic Data Abstractions in a Distributed Collaborative Editing System," *Proceedings of the ACM Symposium on Principles of Programmed Languages*, St. Petersburg, Fla., Jan. 1986, pp. 160-172.

Foster, G., *CoLab, Tools for Computer-Based Cooperation*, University of California, Computer Science Dvision, Berkeley, Calf., Report No. UCB/CSD 84/215, 1984.

Stefik, M., Bobrow, D. G., Mittal, S. and Conway, L., "Knowledge Programming in Loops: Report on an Experimental Course," *The Al Magazine*, Fall 1983, pp. 3-13.

Leblang, D. B. and Chase, R. P., Jr. "Computer-Aided Software Engineering in a Distributed Workstation Environment," in Henderson, P., (Ed.), *Proceedings of the ACM SIGSOFT/SIGPLAN Software Engineering Symposium on Practical Software Development Environments*, Pittsburgh, Penna., Apr. 23-24, 1984.

Stefik, M., and Bobrow, D. G., "Object-Oriented Programming: Themes and Variations," *The Al Magazine*, 1986, pp. 40-62.

SMALL-SCALE WORKSPACE REPRESENTATIONS INDICATING ACTIVITIES BY OTHER USERS

This is a continuation, of application Ser. No. 07/127,814, filed Dec. 2, 1987 now abandoned.

Cross-reference to copending, coassigned U.S. patent application Ser. No. 127993, entitled "Representation of Collaborative Multi-User Activities Relative to Shared Structured Data Objects in a Networked Workstation Environment" and incorporated herein by reference.

BACKGROUND OF THE INVENTION

This invention relates to collaboration between users, each of whom has a display and an input device for viewing and operating on shared data.

A wide variety of techniques are known for enabling more than one user to access shared data. In some techniques, shared data can only be displayed to one user at a time, while in others, shared data can be displayed to a number of users at the same time.

The display of shared data can take various forms. A common technique is to present the shared data at a legible scale in a display region, such as a window. In order to clear display area, however, it may be useful to provide a smaller representation of the shared data such as an icon when the user is not engaged in activities relating to the shared data.

G. Foster, *Collaborative Systems and Multi-user Interfaces*, Ph. D. Thesis, University of California, Computer Science Division, Report No. CSD/UCB 86/326, 1986, defines a multi-user interface as a human-machine interface coordinated for several users sharing information at the same time, at page 35. At page 36, Foster discusses the use in multi-user applications of compressed versions of windows in which general activity is discernible but details are suppressed, and suggests this as an approach to the screen space problem. FIG. 4.1 shows a shared window that is seen on the display of each participant in a session using Cognoter, a program that provides a multi-user interface and a structured meeting process. FIG. 4.3 shows how a number of windows may appear during a Cognoter session, with some windows overlapping others. Tables 4.1, 4.2 and 4.3 show a "Scrunch" operation that shrinks a display window. At page 87, Foster discusses busy signals, illustrated in FIG. 4.9, that signal potential conflict between users by greying-out items being edited, moved or grouped by other users.

The ViewPoint ("VP") software system available from Xerox Corporation for its workstations includes file drawers, described in "Filing," *VP Series Reference Library*, Version 1.0, Xerox Corporation, 1985, pp 1–60. As described at pages 3–7 and 20–21, a file drawer is a container for filing documents created on a workstation; when an icon on the workstation display is moved or copied to a file drawer icon, the corresponding information, referred to as an object, is stored on a file server, and can be shared by many users, in accordance with access rights, illustrated at pages 40–43. A file drawer is represented by a relatively small icon with a design suggesting a drawer and with a name appearing within the design. By a sequence of keyboard and mouse signals, the user can select the icon and request an open operation, in which case a window appears showing the file drawer contents, as described and shown at pages 9–10 and 32–34. Unless covered by a window, the file drawer icon remains visible in shadow form while its window is open. The user can subsequently close the file drawer window, in which case it disappears and the icon resumes its original appearance. The ViewPoint system also includes reference icons, described at pages 11–15, 22–25 and 49–60, which can also be used to access shared data.

*Interleaf Technical Publishing Software Reference Manual,* Release 3.0 Vol. 1, 1986, pp. 15-1 through 15-18 and 16-1 through 16-19 describes features of Technical Publishing Software (TPS) that can be used similarly to the ViewPoint system's reference icons. Desktop links, described beginning at page 15-12, can be used to share files throughout a network, enabling a user to link to objects on other users' desktops, as further described at pages 15-17 and 15-18. In addition, every desktop has access to objects in the System cabinet through links. Link permissions and ownership are described beginning at page 15-13, and the Document Locked stickup is described beginning at page 15-15. This stickup, shown in FIG. 15-9, includes a message with information about the lock on a document, as would occur if the document were already open, either through a link or at another workstation using the same desktop. The use of links in a book, a special directory that creates a relationship among documents it contains, is described beginning at page 16-18.

Techniques are also known for providing information to users of shared data about the activities of other users. Sarin, S. K. and Greif, I., "Software for Interactive On-Line Conferences," *Proceedings ACM-SIGOA Conference on Office Information Systems,* Toronto, Canada, June 25–27, 1984, describe a real-time conferencing system, RTCAL, in which a number of conference participants can each see a shared bitmap in a screen region, as shown in FIG. 3-2. Each user has a pointing device such as a mouse, and when a bitmap-server that supports the shared bitmap receives input indicating pointing activity by one of the participants, that participant's cursor is updated on every participant's bitmap, as described in Section 3 at pages 15 and 18.

Sarin, S. K., *Interactive On-Line Conferences,* PhD thesis, M.I.T. Department of Electrical Engineering and Computer Science, May 1984, also describes RTCAL, at pages 201–206. Elsewhere, at pages 47–57, Sarin describes JEDI, a real-time joint document editing system that includes a status window showing who is in a conference and other useful information about participants, as described at pages 48 and 52 in relation to the shared space shown in FIG. 2-4 and at page 57 in relation to a participant leaving a conference. Sarin discusses status information more generally at pages 75–78, pointing out ways in which a participant can know what other participants are doing and looking at. On page 78, Sarin points out that not all status information may fit on a participant's screen at once, and suggests allocating a small amount of screen space to a main summary, with more detailed information available when needed by a "pop-up" viewport; Sarin also suggests special notification of significant changes in conference status, accompanied by an attention-getting mechanism such as a bell ringing or flashing part of the screen where the notification appears. Pages 206–213 describe MBlink, in which each user can see the positions of each workstation's mouse. Pages 214–227 describe XMBlink, a design that extends this feature. Sarin, S. K. and Greif, I., "Computer-Based Real-Time Conferencing Systems" *Computer,* October 1985, pp. 33–45, describe at page 34 a number of other systems providing information about activities of other users. FIG. 1 shows a summary window that provides further information about other participants in a conference and an events window that displays important changes in status, such as when a participant is leaving or joining or the passing of control, as described at page 36.

Greif, I., Seliger, R. and Weihl, W., "Atomic Data Abstractions in a Distributed Collaborative Editing System," *Proceedings of the ACM Symposium on Principles of Programming Languages,* St. Petersburg, Florida, January 1986, pp. 160–172, describe a distributed collaborative editing system called "CES." The functionality and design of CES are described at pages 164–165, including the sharing of documents among multiple authors. While a "tickle" lock is held, small actions made by the owner are committed after certain editing commands and remain visible when the lock is released. Screen of all readers of text that is being modified are updated at regular intervals as each small action commits.

Foster, G., *CoLab, Tools for Computer-Based Cooperation,* University of California, Computer Science Division, Berkeley, California, Report No. UCB/CSD 84/215, 1984, describes the use of RemoteMice, personalized images of mouse cursors active on remote machines, at page 13. The relaxation of WYSIWIS ("What You See Is What I See"), discussed at page 8, permits differences between the views of a display object seen by different users, which could be implemented by associating windows of different sizes or screen positions or by providing visible remote cursors only on demand.

Stefik, M., Bobrow, D. G., Mittal, S. and Conway, L., "Knowledge Programming in Loops: Report on an Experimental Course," *The AI Magazine,* Fall 1983, pp. 3–13, describe *Truckin'*, a workstation board game in which each player has an iconic truck, as shown and described in relation to FIG. 5. Each player can have a separate workstation. Gauges described at pages 6–9 indicate the fuel, weight, and volume of each player's truck, and that can be observed by other players. Stefic, M. J., Bobrow, D. G. and Kahn, K. M., "Integrating Access-Oriented Programming into a Multiparadigm Environment," *IEEE Software,* January 1986, pp 10–18 also describe gauges at pages 14–15 and *Truckin'* at pages 16–17.

Davids et al., U.S. Pat. No. US-A 4,525,779, describe a conversational video system capable of providing interactive conversational video data communications between pairs of users and that enables multiple conversations to be carried out by a given user in real-time, as shown and described in relation to FIGS. 1–2. The display at a keystation can be divided into a plurality of areas that can include first and second conversation areas or a first conversation area and an area for retrieved data, as shown and described in relation to FIG. 11 and FIGS. 10A–10F. Another feature is an incoming calls area of the display containing brief details of incoming calls and their interest messages, and the user may accept one of the incoming calls shown in order to have it displayed in one of the conversation areas. A user can list others from whom he is not prepared to accept calls using a CALL INHIBIT function or can specify a list of others to whom a call is directed using a CALL LIST function, as shown and described in relation to FIGS. 14–43.

Leblang, D. B. and Chase, R. P., Jr., "Computer-Aided Software Engineering in a Distributed Workstation Environment," in Henderson, P., (Ed.), *Proceedings of the ACM SIGSOFT/SIGPLAN Software Engineering Symposium on Practical Software Development Environments,* Pittsburgh, Penn., April 23–24, 1984, describe DSEE, a software development environment. As described and shown in the fifth and sixth pages, each of a group of users sees the items completed by other users immediately, as a reference to the completed item.

SUMMARY OF THE INVENTION

The present invention provides techniques by which a small-scale representation can be used to present information about activities of other users. The present invention further provides techniques by which a small-scale representation can be used to present quantitative information about changes made by other users.

One aspect of the invention is based on the recognition of a basic problem in a collaborative system, i.e. a real-time computer-based cooperative environment. A user can often benefit from knowing the state of activities of other users even when not engaged in activities with those other users. For example, a user may need information about activities of another user affecting shared data because such activities make that user's local copy of the shared data inconsistent with the other user's copy. In a collaborative system that permits concurrent access to shared data by more than one user, a user may wish to join a group engaged in activity related to shared data even when the shared data is not affected. For example, a user may wish to rejoin a group viewing shared data when the group has reached a certain stage in its work or when another user joins the group. Or if the system allows more than one subgroup, a user in one subgroup may need information about the progress of another subgroup. In all these cases, it is inconvenient if the user needing information about activities of other users must view the same data as those other users at full scale and monitor any changes being made, because that data will occupy screen area that could other wise be used for other activities.

This aspect of the invention is further based on the recognition that this problem can be solved by displaying to the user a small-scale representation that includes information about the activities of other users relating to shared data. Because the representation is small-scale, it does not interfere with the user's view of other objects on the display. And the user can learn the current state of activity from the small-scale representation, making it unnecessary to view the shared data at full scale until a desired state of activity is reached. Then, the user can begin viewing the shared data at full scale by selecting the small-scale representation and requesting an appropriate operation.

A variety of techniques can be used to indicate the activities of other users. When they change data, the small-scale representation could include a flickering indicator, for example. If the shared data is presented to each user as a display object or within a workspace such as a window, each small-scale representation could include, in shrunken form, the current version of that display object or workspace, with systematic distortions to enable a user to recognize it and with updating to indicate changes. The small-scale representation could include an indication of which users are currently viewing the full scale representation and which users are only viewing the small-scale representation. The small-scale representation could include an indicator of the type of activity in progress.

Another aspect of the invention is based on the recognition that a user viewing a small-scale representation is likely to make decisions based on how much change other users have made in the shared data or on how rapidly other users are making changes. When other users have made extensive changes, the user may wish to view the data with the changes or may wish to update a local copy of the shared data. When other users begin making changes very rapidly, the user may wish to view the contents to understand why the changes are necessary. The need for such information can be solved by including in the shrunken representation an indicator of a quantitative measure of change that is updated as changes occur. The quantitative measure could indicate the cumulative amount of change or the current rate of change.

These and other objects, features and advantages will be more fully understood from the following description, together with the attached drawings and claims.

DETAILED DESCRIPTION

A. General Features

Figure 1:
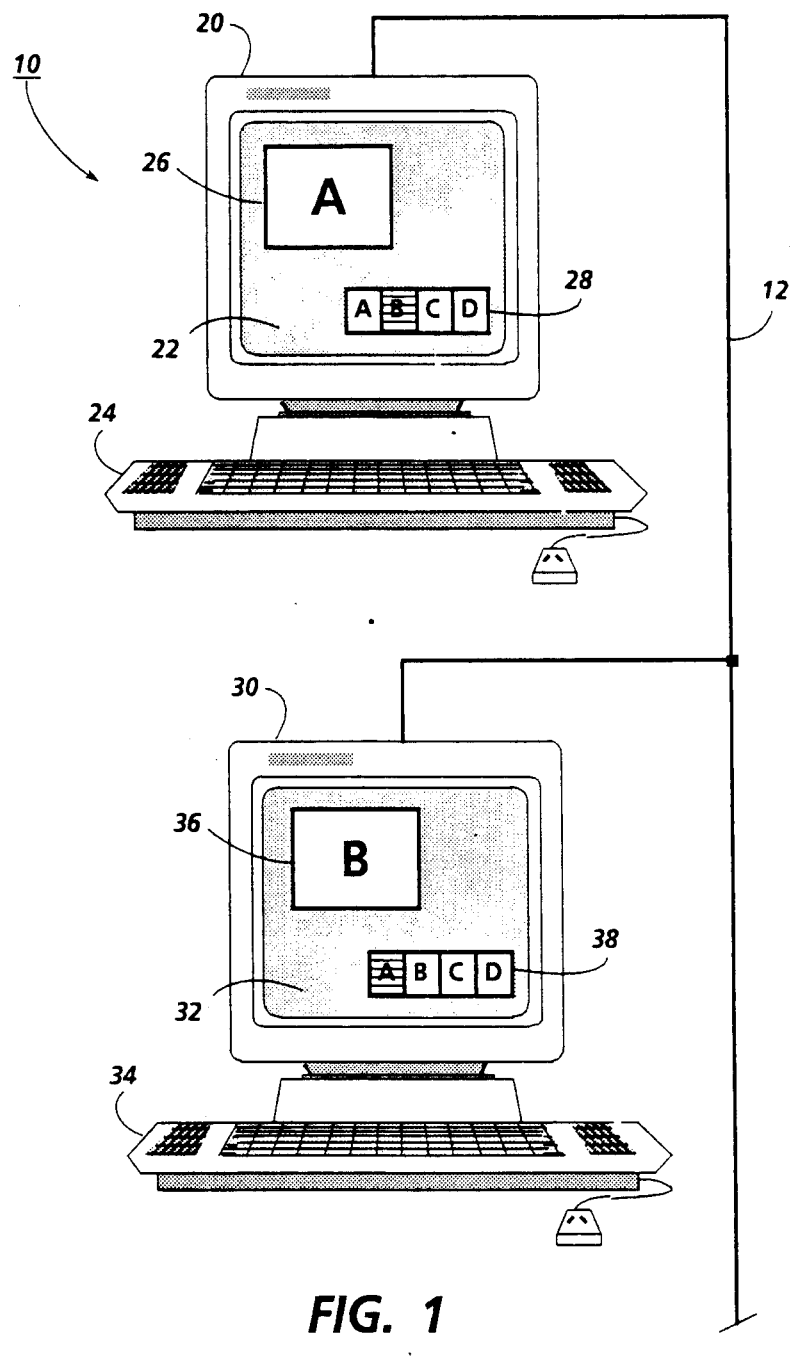
FIG. 1 is a schematic diagram showing shrunken representations in accordance with the invention.
Figure 2:
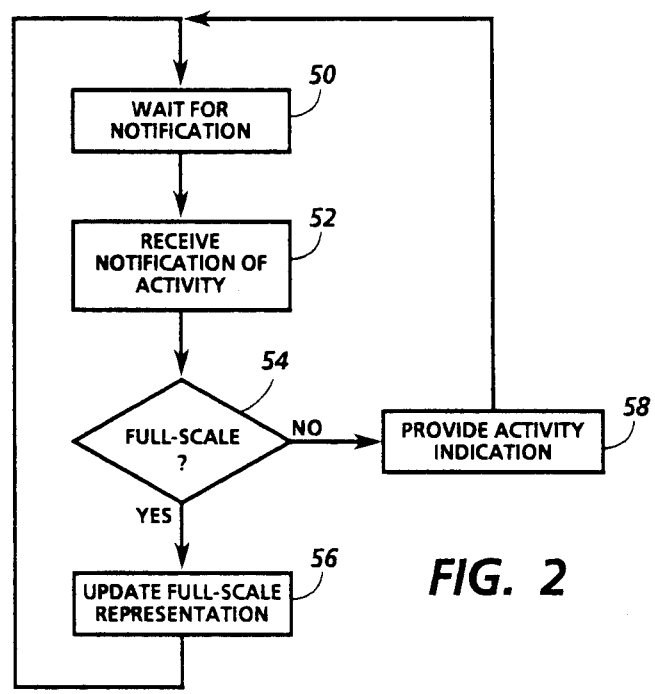
FIG. 2 is a flow chart showing general steps in providing the shrunken representations of FIG. 1.

General features of the invention can be understood from FIGS. 1 and 2. FIG. 1 shows two workstations of system 10, illustrating display of shrunken representations with indications of activities of other users. FIG. 2 shows steps in providing such indications.

System 10 includes network 12, to which a number of workstations, including workstations 20 and 30, are connected. System 10 is a collaborative system, meaning that it enables users at different workstations to work together in real-time. As discussed in more detail below, the collaborative functions of system 10 could be centralized in a single main CPU, could be distributed among processors at the workstations, or could be provided in any combination of centralization and distribution. Similarly, network 12 could take any appropriate configuration capable of providing the necessary communications to support collaboration.

System 10 includes display-based user interfaces, with each workstation including a display device and a user input device; workstations 20 and 30 illustratively include respective CRT screens 22 and 32 and keyboards 24 and 34, each with a mouse. System 10 includes an object-based display system that controls each display device, whether a CRT or other device.

Copending, coassigned U.S. patent application Ser. No. 127,997, entitled "Multiple Shared Virtual Workspaces" and incorporated herein by reference, sets forth a conceptual framework for describing features in relation to the display system. In addition to the framework set forth there, the present invention involves the notion of a representation of shared data. The term "shared data" is used herein to refer to any body of data that is accessible to more than one user through the display system. A representation of shared data is any way of displaying the shared data, whether as a simple display object, as the contents of the entire display screen, or as the contents of any workspace, whether the workspace is thought of as a room, a window, a blackboard, a sketchpad, a spreadsheet, a card or any other type of entity for presenting data within an area of a display. A representation may be at full scale, occupying a substantial part of the display area, in which case the details of the shared data will ordinarily be visible to a viewer, albeit in some mapped form such as a sequence of characters or a bitmapped graphical object; a body of shared data may be amenable to many different full-scale representations, as when a document can be displayed page-by-page. A representation may also be at a small scale, occupying a small part of the display area, in which case the details of the shared data may not be visible. A small-scale representation could be a small portion of the full-scale representation of the same shared data, showing the details of a small area; it could be a shrunken version of the full-scale representation, showing some general features of the full-scale representation but omitting the details; a small-scale representation could also be an icon or other small display object that shows virtually none of the features of the full-scale representation other than an identifier such as a name.

Due to the limits of human perception and the typical display size, small-scale representations of data frequently have a fixed size of about one square inch or less. The size of a small-scale representation is typically large enough to have a characteristic shape and an identifier. A small-scale representation may not itself enable the user to access the corresponding data, but it may typically be selected as part of an operation to obtain a full-scale representation of the corresponding data. Full-scale representations, on the other hand, are often variable in size and can range from a few square inches up to the full available display area or even larger through techniques such as scrolling. A user is typically able to select a display object within the full-scale representation upon which an operation is to be performed, resulting in access to the corresponding data. Many conventional graphical user interfaces have readily identifiable full-scale and small-scale representations of data, such as windows and icons.

FIG. 1 shows screen 22 displaying full-scale representation 26 and small-scale representations 28, while screen 32 is displaying full-scale representation 36 and small-scale representations 38. Small-scale representations 28 and 38 each include four representations, with the respective characters A, B, C and D within them. Each representation corresponds to a respective body of shared data, and sharing of data enables users at different workstations to work together in real time on the same data. The bodies of shared data need not be mutually exclusive.

Full-scale representation 26 on screen 22 shows a first body of shared data, corresponding to the small-scale representations that contain the character A, while full-scale representation 36 on screen 32 shows a second body of shared data, corresponding to the small-scale representations that contain the character B. The user at workstation 20 thus has access to the first body of shared data, and in addition to viewing that data at full scale may also be able to modify or otherwise affect it. The user at workstation 30 similarly has access to the contents of the second body of shared data.

FIG. 1 shows that the small-scale representations of the first and second bodies of shared data at each workstation include indications of activities relating to the respective shared data at other workstations. The small-scale representation of the second body of shared data on screen 22 is shaded to indicate activity relating to that data at another workstation, and the small-scale representation of the first body of shared data on screen 32 is similarly shaded. Upon receiving the indication of activity relating to the second body of shared data, the user at workstation 20 may decide to view the full-scale representation of that data during that activity. To do so, the user could invoke an operation resulting in the full-scale representation, such as by selecting the corresponding small-scale representation with the mouse and performing keyboard operations to invoke an expand or open operation.

FIG. 2 shows general steps of a routine that provides these indications of activity. The steps of FIG. 2 could be performed locally by a routine at each workstation or could be performed centrally by one or more routines that control the local workstations. The step in box 50 waits for a signal notifying the routine that a change in the activities affecting one of the bodies of shared data has occurred. When notification of a modification of the activity state of shared data is received, in box 52, the routine determines in box 54 whether that body of shared data is displayed in a full-scale representation on the relevant workstation. If so, the full-scale representation is updated as appropriate in box 56. But if not, an appropriate activity indication is provided in the small-scale representation of that shared data, in box 58. As a result, the small-scale representation of a body of shared data will include an appropriate activity indication at each workstation at which that body is not displayed at full scale.

Indication of activities relating to shared data can be provided in many ways. The shading of FIG. 1 is illustrative, but blinking, inversion, or other techniques would be equally appropriate. Shading, blinking, inversion or the like provide only binary information, indicating whether or not activity relating to shared data is occurring. Additional information about the type of activity may be helpful, such as whether the activity affects the shared data, such as by editing, adding data or making other modifications. The identity of the user performing an activity relating to shared data may also be helpful. If the collaborative system is the type in which a body of shared data can be concurrently accessed from more than one workstation, additional information about the size or membership of the group currently accessing a body of shared data may similarly be helpful. We turn now to techniques for providing more detailed information about activities at other workstations that affect a body of shared data.

B. Quantitative Indications

Figure 4:
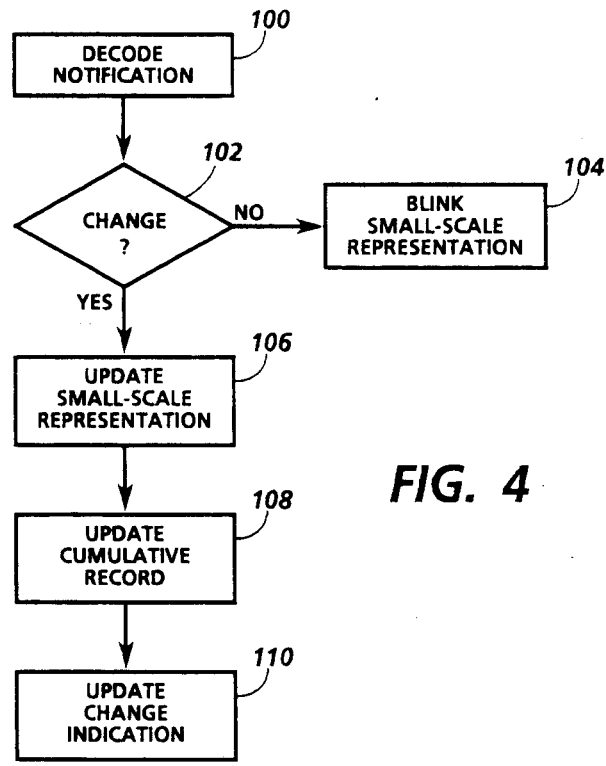
FIG. 4 is a flow chart showing steps for providing activity indication in the shrunken representations of FIGS. 3A and 3B.
Figure 3A:
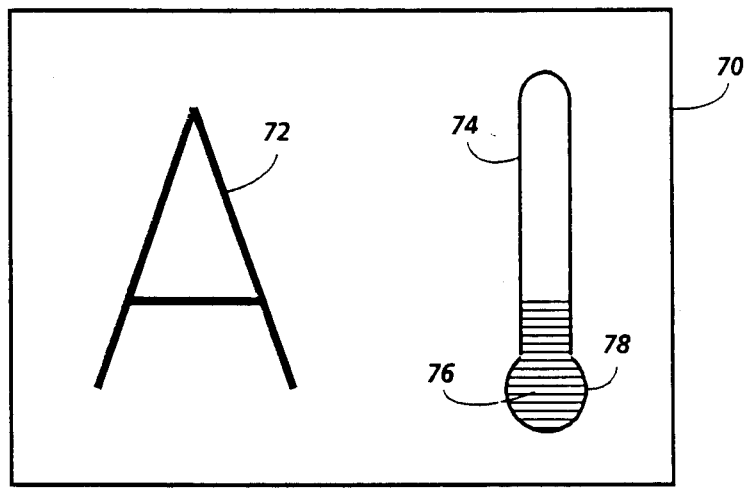
FIGS. 3A and 3B are schematic diagrams showing examples of shrunken representations in accordance with the invention.
Figure 3B:
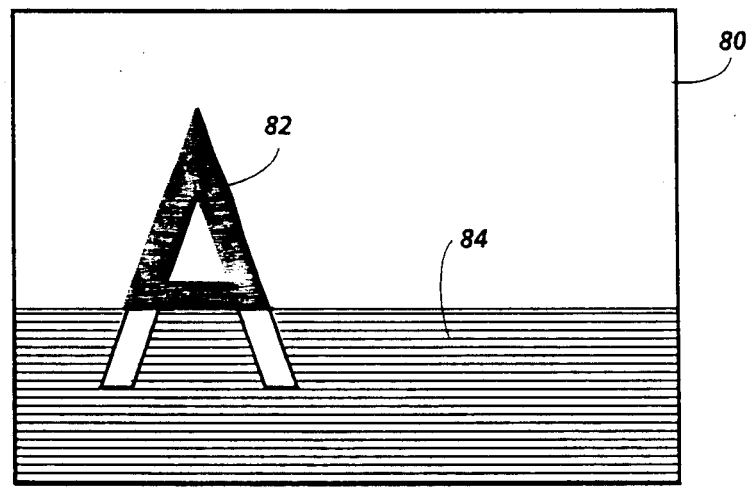

One aspect of the invention is to provide a quantitative indication of the extent of activity affecting a body of shared data. FIGS. 3A and 3B show two small-scale representations that include, in addition to an indication of activity relating to the corresponding shared data, a quantitative indication of the extent of that activity. FIG. 4 shows steps in updating these small-scale representations.

Small-scale representation 70, in FIG. 3A, includes a quantitative indication of the extent of activity affecting a body of shared data represented in shrunken form by character 72. The quantitative indication appears in thermometer outline 74 in the form of shaded area 76. When activity affecting the shared data begins to occur, shaded area 76 begins to appear at bulb end 78 of thermometer outline 74. As more activity affecting the shared data occurs, shaded area 76 expands, so that its rate of expansion indicates the rate of activity. Its size in relation to thermometer outline 74 indicates the extent of activity affecting the shared data.

Small-scale representation 80, in FIG. 3B, includes another quantitative indication of the extent of activity affecting a body of shared data represented in shrunken form by character 82. The quantitative indication appears in the form of inverted area 84. When activity affecting the shared data begins to occur, inverted area 84 begins to appear at the lower side of small-scale representation 80. As more activity affecting the shared data occurs, inverted area 84 expands upward, its rate of expansion indicating the rate of activity and its size in relation to small-scale representation 80 indicating the extent of activity.

The steps in FIG. 4, all of which could be part of the step in box 58 of FIG. 2, update a small-scale representation with a quantitative indication of the type illustrated in FIGS. 3A and 3B to indicate the extent of activities changing a body of shared data. The step in box 100 decodes the notification of activity received in box 52, to determine the body of shared data affected and the type of activity that occurred. The test in box 102 then tests whether the type of activity is a change in the shared data. If not, the small-scale representation of that body of shared data is blinked in box 104, indicating that an activity relating to that shared data occurred, but also indicating that the activity is not of a type that changes the shared data.

If the result of the test in box 102 is that a change occurred, the step in box 106 updates the contents of the small-scale representation of that body of shared data, a step that will provide a visible indication of activity only if the change is large enough in scale to produce a visible update of the small-scale representation. The step in box 108 updates a record of the cumulative changes affecting that body of shared data since the last time it was represented at full scale on this workstation. This record, which is cleared when the shared data is displayed at full scale, provides the basis of the quantitative indication. It could be a record of the number of changes that have occurred. If the notification of a change indicates how much of the shared data is affected by the change, the record could include data indicating how much of the shared data has been changed. Based on this record, the quantitative change indication is updated, in box 110, so that it indicates the extent of activity affecting the body of shared data. The change indication could be proportional or could be distorted in any appropriate way to provide optimal information to users.

As a result of this technique, the small-scale representation includes an indication of the type of activity affecting the shared data in the form of a blinking or the like; a quantitative indication of the extent of changes in the shared data; and an indication of the rate of changes in the shared data over time.

C. Miscellaneous

The invention could be implemented in a wide variety of ways. For example, it could be implemented in the system described in Foster, G., *Collaborative Systems and Multi-user Interfaces*, PhD. Thesis, University of California, Berkeley, Computer Science Division, Report No. CSD/UCB 86/326, 1986, incorporated herein by reference. This implementation would use LOOPS, discussed more fully in Bobrow, D. G. and Stefik, M., *The LOOPS Manual*, Xerox Corporation, December 1983, also incorporated herein by reference. Loops gauges could be used, as described in Stefik, M. and Bobrow, D. G., "Object-Oriented Programming: Themes and Variations," *The AI Magazine*, 1986, pp. 40–62, at page 58–60.

Another alternative would be to provide small-scale representations of the type shown in FIG. 5 of copending, coassigned U.S. patent application Ser. No. 030,766, entitled "User Interface with Multiple Virtual Workspaces for Sharing Display System Objects" and incorporated herein by reference. These representations include the contents of a workspace in shrunken form, and could be used in combination with the multiple workspace sharing techniques described in copending, coassigned U.S. patent application Ser. No. 127,997, entitled "Multiple Shared Virtual Workspaces" and also incorporated herein by reference.

The implementation described above could be a distributed implementation, with all collaborative functions performed at workstations. A description of such an implementation appears in Stefik, M., Bobrow, D. G., Lanning, S., Tatar, D. and Foster, G., "WYSIWIS Revised: Early Experiences with Multi-User Interfaces," *Proceedings of the Conference on Computer-Supported Cooperative Work*, Austin, Texas, Dec. 3–5, 1986. pp. 276–290, incorporated herein by reference. The invention could also be implemented, however, with a server performing all or most of the collaborative functions, including the steps described above in relation to FIGS. 2 and 4, in which case the server would provide the full- and small-scale representations for display at each workstation.

Various small-scale representations of data could include indications of activities in accordance with the invention. Icons, stamps, doors, shrunken windows and shrunken representations of workspaces are all examples of small-scale representations to which the invention could be applied if they represent shared data.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed is:

1. A method of operating a collaborative system that includes a plurality of workstations each having a respective display and a respective user input device, the collaborative system further including a set of bodies of shared data, each of the workstations being connected to access the bodies of shared data for presentation of a respective full-scale representation of any of the bodies of shared data on the respective display, the respective full-scale representation of any of the bodies of shared data occupying a substantial part of the respective display, the collaborative system further being for presenting the respective full-scale representations of any of the bodies of shared data concurrently on the respective displays of more than one of the workstations, the method comprising:

presenting on the respective display of a first one of the workstations a set of small-scale representations, each small-scale representation representing a respective one of the bodies of shared data, each small-scale representation occupying a small part of the first workstation's respective display, a first one of the set of small-scale representations representing a first one of the bodies of shared data;

presenting on the respective display of a second one of the workstations the respective full-scale representation of the first body of shared data; and upon receiving a signal requesting activity affecting the first body of shared data from the respective user input device of the second workstation, presenting in the first small-scale representation an indication of the activity at the second workstation.

2. The method of claim 1 in which each of the small-scale representations has a size of about one square inch or less.

3. The method of claim 1 in which each of the small-scale representations is an icon.

4. The method of claim 1 in which each of the small-scale representations includes an identifier of the respective body of shared data.

5. The method of claim 1, further comprising, in response to a signal from the respective user input device of the first workstation further indicating selection of the first small-scale representation on the respective display and requesting that the respective full-scale representation of the first body of shared data be presented on the respective display of the first workstation, presenting the respective full-scale representation on the first workstation's respective display in response to the signal.

6. The method of claim 1 in which the step of presenting the small-scale representations further includes presenting the respective full-scale representation of a second one of the bodies of shared data on the respective display of the first workstation.

7. The method of claim 1, further comprising determining whether the respective full-scale representation of the first body of shared data is being presented at the first workstation and performing the step of presenting the indication of activity if the respective full-scale representation of the first body of shared data is not being presented.

8. The method of claim 7, further comprising, if the determining step determines that the respective full-scale representation of the first body of shared data is being presented at the first workstation, updating the respective full-scale representation.

9. The method of claim 1 in which the first small-scale representation includes a shrunken version of the respective full-scale representation of the first body of shared data and an indication of change in the first body of shared data.

10. The method of claim 1 in which the step of presenting the indication of activity comprises determining whether the requested activity is of a particular type and presenting the indication based on whether the requested activity is of the particular type.

11. The method of claim 10 in which the step of presenting the indication comprises blinking the first small-scale representation if the determining substep determines that the requested activity does not change the first body of shared data.

12. The method of claim 10 in which the first small-scale representation includes a quantitative indicator of change, the step of presenting the indication comprises updating the quantitative indicator of change if the determining substep determines that the requested activity changes the first body of shared data.

13. The method of claim 1 in which the first small-scale representation includes a quantitative indicator of activity affecting the first body of shared data, the step of presenting the indication comprising updating the quantitative indicator.

14. The method of claim 1 in which the step of presenting the respective full-scale representation of the first body of shared data comprises presenting a shared workspace.

15. A method of operating a collaborative system that includes a plurality of workstations each having a respective display and a respective user input device, the collaborative system further including a set of bodies of shared data, each of the workstations being connected to access the bodies of shared data for presentation of a respective full-scale representation of any of the bodies of shared data on the respective display, the respective full-scale representation of any of the bodies of shared data occupying a substantial part of the respective display, the collaborative system further being for presenting the respective full-scale representations of any of the bodies of shared data concurrently on the respective displays of more than one of the workstations, the method comprising:

presenting on the respective display of a first one of the workstations a set of small-scale representations, each small-scale representation representing a respective one of the bodies of shared data, each small-scale representation occupying a small part of the first workstation's respective display, a first one of the set of small-scale representations representing a first one of the bodies of shared data;

presenting on the respective display of a second one of the workstations the respective full-scale representation of the first body of shared data; and upon receiving a signal requesting activity relating to the first body of shared data from the respective user input device of the second workstation, presenting in the first small-scale representation an indication of the activity at the second workstation.

16. The method of claim 15 in which each of the small-scale representations has a size of about one square inch or less.

17. The method of claim 15 in which each of the small-scale representations is an icon.

18. The method of claim 15 in which each of the small-scale representations includes an identifier of the respective body of shared data.

19. The method of claim 15, further comprising, in response to a signal from the respective user input device of the first workstation further indicating selection of the first small-scale representation on the respective display and requesting that the respective full-scale representation of the first body of shared data be presented on the respective display of the first workstation, presenting the respective full-scale representation on the first workstation's respective display in response to the signal.

20. The method of claim 15 in which the step of presenting the small-scale representations further includes presenting the respective full-scale representation of a second one of the bodies of shared data on the respective display of the first workstation.

21. The method of claim 15, further comprising determining whether the respective full-scale representation of the first body of shared data is being presented at the first workstation and performing the step of presenting the indication of activity if the respective full-scale representation of the first body of shared data is not being presented.

22. The method of claim 21, further comprising, if the determining step determines that the respective full-scale representation of the first body of shared data is being presented at the first workstation, updating the respective full-scale representation.

23. The method of claim 15 in which the first small-scale representation includes a shrunken version of the respective full-scale representation of the first body of shared data and an indication of change in the first body of shared data.

24. The method of claim 15 in which the step of presenting the indication of activity comprises determining whether the requested activity is of a particular type and presenting the indication based on whether the requested activity is of the particular type.

25. The method of claim 24 in which the step of presenting the indication comprises blinking the first small-scale representation if the determining substep determines that the requested activity does not change the first body of shared data.

26. The method of claim 24 in which the first small-scale representation includes a quantitative indicator of change, the step of presenting the indication comprises updating the quantitative indicator of change if the determining substep determines that the requested activity changes the first body of shared data.

27. The method of claim 15 in which the first small-scale representation includes a quantitative indicator of activity affecting the first body of shared data, the step of presenting the indication comprising updating the quantitative indicator.

28. The method of claim 15 in which the step of presenting the respective full-scale representation of the first body of shared data comprises presenting a shared workspace.

* * * * *